US009147935B2

(12) United States Patent
Keidar

(10) Patent No.: US 9,147,935 B2
(45) Date of Patent: Sep. 29, 2015

(54) MAINTENANCE OF MOBILE DEVICE RF BEAM

(75) Inventor: Ron Keidar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 849 days.

(21) Appl. No.: 13/358,182

(22) Filed: Jan. 25, 2012

(65) Prior Publication Data

US 2013/0040655 A1 Feb. 14, 2013

Related U.S. Application Data

(60) Provisional application No. 61/522,068, filed on Aug. 10, 2011.

(51) Int. Cl.
*H04W 24/00* (2009.01)
*H01Q 3/26* (2006.01)
*H01Q 1/24* (2006.01)

(52) U.S. Cl.
CPC ................. *H01Q 3/26* (2013.01); *H01Q 1/245* (2013.01); *H01Q 1/246* (2013.01)

(58) Field of Classification Search
CPC ........ H01Q 1/1257; H01Q 1/245; H01Q 3/24
USPC ........................................................ 455/456.1
See application file for complete search history.

(56) References Cited

U.S. PATENT DOCUMENTS 6,195,559 B1 * 2/2001 Rapeli et al. .................. 455/500
7,477,190 B2 1/2009 Bang et al.
7,515,874 B2 4/2009 Nikolajevic et al.
7,894,830 B2 2/2011 Rofougaran et al.
2002/0147032 A1 10/2002 Yoon et al.

(Continued)

FOREIGN PATENT DOCUMENTS

EP 1369954 A2 12/2003
EP 1562257 A1 8/2005

(Continued)

OTHER PUBLICATIONS

International Search Report and Written Opinion—PCT/US2012/050463—ISA/EPO—Nov. 7, 2012.

*Primary Examiner* — Kwasi Karikari
(74) *Attorney, Agent, or Firm* — Linda G. Gunderson

(57) ABSTRACT

A mobile wireless communication device includes: a communication device housing; an antenna module configured to provide an antenna pattern having a directional beam to transmit electromagnetic energy of outgoing signals and to receive electromagnetic energy of incoming signals; a beam-altering module communicatively coupled to the antenna module and configured to alter a three-dimensional direction that the directional beam is pointing; and a three-dimensional orientation sensor module communicatively coupled to the beam-altering module and configured to provide at least one indication of three-dimensional orientation information associated with the communication device; where the beam-altering module is configured to receive the at least one indication of three-dimensional orientation information associated with the communication device and to use the at least one indication of three-dimensional orientation information associated with the communication device to alter the three-dimensional direction that the directional beam is pointing.

31 Claims, 7 Drawing Sheets

(56) References Cited

U.S. PATENT DOCUMENTS

| | | | |
|---|---|---|---|
| 2006/0232468 | A1 | 10/2006 | Parker et al. |
| 2007/0063911 | A1 | 3/2007 | Davidson et al. |
| 2007/0164902 | A1 | 7/2007 | Bang et al. |
| 2008/0268865 | A1 | 10/2008 | Tung |
| 2010/0124210 | A1 | 5/2010 | Lo |
| 2010/0130230 | A1 | 5/2010 | Aggarwal et al. |
| 2011/0201357 | A1 | 8/2011 | Garrett et al. |
| 2011/0309980 | A1 * | 12/2011 | Ali et al. ........................ 342/368 |

FOREIGN PATENT DOCUMENTS

| | | | |
|---|---|---|---|
| WO | 0064006 | A1 | 10/2000 |
| WO | 2010092421 | A1 | 8/2010 |

* cited by examiner

MAINTENANCE OF MOBILE DEVICE RF BEAM

CLAIM OF PRIORITY UNDER 35 U.S.C. §119

The present Application for Patent claims priority to Provisional Application No. 61/522,068 entitled "DIRECTION MAINTENANCE OF MOBILE DEVICE RF BEAM USING MOTION SENSORS" filed Aug. 10, 2011, and assigned to the assignee hereof and hereby expressly incorporated by reference herein.

BACKGROUND

Wireless communication devices are incredibly widespread in today's society. For example, people use cellular phones, smart phones, personal digital assistants, laptop computers, pagers, tablet computers, etc. to send and receive data wirelessly from countless locations. Wireless communication devices are typically served by base transceiver stations (BTSs). With numerous users served by a single BTS, noise and interference between the mobile devices and the BTS as well as with other signals make the transmission of information more difficult, e.g., to transmit the data accurately. Further, the noise and interference reduce the throughput of the wireless communication systems, e.g., due to omni-directional transmission in which each device contributes to the noise of its counterparts.

One technique employed currently for helping to reduce the noise and interference and increase data throughput in wireless communication networks is to beam form from the BTS. In this technique, an antenna beam from the BTS is produced in a direction for a particular wireless communication device in order to use a higher directivity antenna pattern, thereby allowing a reduction in transmission power and a reduction in noise and interference for communications or data transmission from the BTS to a particular mobile device.

Another technique to combat noise and interference is to use a mechanically steered antenna. In this example, the antenna can be physically moved at the BTS to point in a desired direction, e.g., toward a satellite.

Another technique to combat noise and interference is to use a mechanically steered antenna. In this example, the antenna can be physically moved at the BTS to point in a desired direction, e.g., toward a satellite.

Another technique for combating interference is to use multiple input and multiple output antennas. The use of multiple antennas on both the transmission and receiving ends allows multiple signals to be combined to provide a combined signal that can be processed to help eliminate the noise and interference effects.

SUMMARY

An example of a mobile wireless communication device includes: a communication device housing; an antenna module configured to provide an antenna pattern having a directional beam to transmit electromagnetic energy of outgoing signals and to receive electromagnetic energy of incoming signals; a beam-altering module communicatively coupled to the antenna module and configured to alter a three-dimensional direction that the directional beam is pointing; and a three-dimensional orientation sensor module communicatively coupled to the beam-altering module and configured to provide at least one indication of three-dimensional orientation information associated with the communication device; where the beam-altering module is configured to receive the at least one indication of three-dimensional orientation information associated with the communication device and to use the at least one indication of three-dimensional orientation information associated with the communication device to alter the three-dimensional direction that the directional beam is pointing.

Implementations of such a device may include one or more of the following features. The beam-altering module is configured to determine a direction from the device toward a base transceiver station. The indication of orientation information associated with the communication device indicates a three-dimensional orientation of the communication device, the communication device further includes a satellite positioning system module configured to determine a location of the device, and the beam-altering module is configured to determine a location of the base transceiver station and being configured to determine the direction from the device toward the base transceiver station using the location of the device, the location of the base transceiver station, and the orientation of the communication device. The at least one indication of three-dimensional orientation information associated with the communication device is at least one indication of change in three-dimensional orientation of the communication device, the communication device further includes a satellite positioning system module configured to determine a location of the device, and the beam-altering module is configured to use the location of the device in addition to the at least one indication of change in three-dimensional orientation of the communication device to alter the three-dimensional direction that the directional beam is pointing. The beam-altering module is configured to determine the direction from the device toward the base transceiver station based on strengths of received signals from different receive paths.

Additionally or alternatively, implementations of the device may include one or more of the following features. The at least one indication of three-dimensional orientation information associated with the communication device is at least one indication of change in three-dimensional orientation of the communication device. The orientation sensor module includes at least one of (1) a three-dimensional gyroscope sensor, or (2) a three-dimensional compass and a gravity sensor. The beam-altering module includes a beam-forming module and the antenna module includes a phased-array antenna that includes antenna elements and a phase module configured to set phases for corresponding ones of the antenna elements to point the directional beam in a desired direction. The beam-altering module includes a beam-steering module configured to direct the directional beam provided by the antenna module. The beam-altering module is configured to adjust a width of the directional beam in response to movement of the device indicated by the three-dimensional orientation sensor module.

Another example of a mobile wireless communication device includes: an antenna module configured to provide an antenna pattern having a directional beam to transmit electromagnetic energy of outgoing communication signals for reception by a base transceiver station and to receive electromagnetic energy of incoming signals from the base transceiver station; direction means for determining a direction of the base transceiver station relative to the communication device; orientation means for determining three-dimensional orientation information associated with the communication device; and altering means, communicatively coupled to the antenna module, the direction means, and the orientation means, for causing the antenna module to set a three-dimensional direction that the directional beam is pointing based on the three-dimensional orientation information from the orientation means.

Implementations of such a device may include one or more of the following features. The orientation information associated with the communication device indicates a three-dimensional orientation of the communication device, the direction means include a satellite positioning system module configured to determine a location of the device, and the altering means are further for determining a location of the base transceiver station and determining the direction from the device toward the base transceiver station using the location of the device, the location of the base transceiver station, and the three-dimensional orientation of the communication device. The orientation information associated with the communication device is a change in orientation of the communication device, the direction means include a satellite positioning system module configured to determine a location of the device, and the altering means are further for using the location of the device in addition to the orientation information to alter the three-dimensional direction that the directional beam is pointing. The direction means are configured to determine the direction of the base transceiver station relative to the communication device based on strengths of received signals at the communication device from different receive paths. The orientation information is a change in three-dimensional orientation of the communication device. The altering means include a beam-forming module and the antenna module includes a phased-array antenna including antenna elements and a phase module configured to set phases for corresponding ones of the antenna elements to point the directional beam in a desired direction. The altering means include a beam-steering module configured to redirect the directional beam provided by the antenna module. The altering means are further for adjusting a width of the directional beam in response to movement of the device indicated by the orientation means.

An example of a computer program product resides on a non-transitory processor-readable medium and includes processor-readable instructions configured to cause a processor to: obtain three-dimensional orientation information for the wireless communication device indicative of a three-dimensional orientation of a wireless communication device; determine, based on the orientation information, a desired change in three-dimensional direction of a directional beam provided by an antenna module of the wireless communication device in order to compensate for a change in three-dimensional orientation of the wireless communication device; and cause the antenna module to change a three-dimensional direction that the directional beam is pointing based on the determined desired change in three-dimensional direction of the directional beam.

Implementations of such a computer program product may include one or more of the following features. The orientation information is present orientation information indicative of a present orientation of the wireless communication device and the instructions configured to cause the processor to determine the desired change are configured to cause the processor to analyze a previous orientation of the wireless communication device indicated by previous orientation information and the present orientation of the wireless communication device indicated by the present orientation information to determine a change in orientation of the wireless communication device. The instructions configured to cause the processor to determine the desired change are configured to cause the processor to account for available directions of the directional beam achievable by the antenna module of the wireless communication device.

Additionally or alternatively, implementations of the computer program product may include one or more of the following features. The computer program product further includes instructions configured to cause the processor to: obtain a location of the wireless communication device; obtain a location of the base transceiver station; and determine a direction from the wireless communication device toward the base transceiver station using the location of the device, the location of the base transceiver station, and the orientation of the communication device. The instructions configured to cause the processor to obtain the location of the wireless communication device are configured to cause the processor to analyze satellite positioning system signals to obtain the location of the wireless communication device.

Additionally or alternatively, implementations of the computer program product may include one or more of the following features. The orientation information is indicative of a change in three-dimensional orientation of the wireless communication device, the instructions further include instructions configured to cause the processor to obtain a location of the wireless communication device, and the instructions configured to cause the processor to determine the desired change are configured to cause the processor to use the location of the wireless communication device in addition to the three-dimensional orientation information. The computer program product further includes instructions configured to cause the processor to determine a direction from the wireless communication device toward a base transceiver station based on strengths of received signals at the wireless communication device from the base transceiver station over different receive paths. The instructions configured to cause the processor to cause the antenna module to change a three-dimensional direction that the directional beam is pointing are configured to cause the processor cause a change in phase of at least one radiating element of a phased-array antenna of the antenna module. The instructions configured to cause the processor to cause the antenna module to change a three-dimensional direction that the directional beam is pointing are configured to cause a beam steering of the directional beam provided by the antenna module.

An example of a method of affecting a direction of a mobile wireless communication device antenna includes: obtaining a first direction of a base transceiver station relative to the mobile wireless communication device; obtaining a three-dimensional orientation of the mobile wireless communication device from at least one orientation sensor of the mobile wireless communication device; determining a second direction of the base transceiver station relative to the three-dimensional orientation of the mobile wireless communication device based upon the first direction and the three-dimensional orientation of the mobile wireless communication device; and setting a three-dimensional beam direction of an antenna beam of an antenna of the mobile wireless communication device according to the second direction.

Implementations of such a computer program product may include one or more of the following features. Obtaining the orientation of the mobile wireless communication device includes obtaining a change in the orientation of the mobile wireless communication device and setting the beam direction includes causing a change in a present beam direction according to the change in the orientation. Obtaining the orientation includes at least one of (1) obtaining three-dimensional gyroscope information or (2) obtaining three-dimensional compass information and gravity direction information. Obtaining the first direction includes at least one of (1) obtaining a location of the mobile wireless communication device using satellite positioning system signals or (2) analyzing strengths of signals received by the mobile wireless communication device from the base transceiver station. Setting the beam direction includes beam-forming the antenna beam. The Setting the beam direction includes beam-steering the antenna beam.

Another example of a mobile wireless communication device includes: an antenna module configured to provide an antenna pattern having a directional beam to transmit electromagnetic energy of outgoing communication signals for reception by a base transceiver station and to receive electromagnetic energy of incoming signals from the base transceiver station; determining means for determining at least one of a measure of signal quality of signals received by the antenna module or a measure of motion of the device, and for providing at least one of an indication corresponding to the signal quality or an indication of the motion exceeding a motion threshold; and altering means, communicatively coupled to the antenna module and the determining means, for causing the antenna module to widen a main beam of the antenna pattern in response to at least one of the indication of signal quality or the indication of the motion exceeding the motion threshold.

Implementations of such a device may include one or more of the following features. The altering means are configured to widen the main beam in response to the signal quality declining. The altering means are configured to widen the main beam in response to a relative power of the received signals dropping below a relative power threshold. The altering means are configured to widen the main beam to a first width in response to the indication of signal quality and to a second width in response to the indication of the motion exceeding the motion threshold, the second width being larger than the first width. The altering means are configured to cause the antenna module to increase power provided by the antenna module for the main beam concurrently with widening the main beam. The altering means are further for causing the antenna module to narrow the main beam of the antenna pattern in the absence of the indication of signal quality and the indication of the motion exceeding the motion threshold. The altering means are configured to cause the antenna module to decrease power provided by the antenna module for the main beam concurrently with narrowing the main beam. The indication of signal quality is at least one of an indication of signal-to-noise ratio of a received signal or a command to widen the main beam. The sensing means are for providing a measure of three-dimensional motion of the device.

Items and/or techniques described herein may provide one or more of the following capabilities, as well as other capabilities not mentioned. The effects of noise and/interference on wireless data communications can be reduced. Data throughput for wireless communications can be increased. Power consumption for wireless communications can be decreased. Beam forming and/or steering can be used at a mobile device to help reduce effects of noise and interference in wireless communications. Beam forming and/or steering can be employed in devices whose orientation changes very rapidly. Beam forming and/or steering at a mobile device can be accomplished in one or two dimensions. While at least one item/technique-effect pair has been described, it may be possible for a noted effect to be achieved by means other than that noted, and a noted item/technique may not necessarily yield the noted effect.

DETAILED DESCRIPTION

Techniques are described herein for determining and adjusting a desired beam direction used by a mobile device for wireless communications. For example, a mobile device such as a phone can determine a direction from the mobile phone to a local base transceiver station (BTS). The mobile phone can monitor orientation sensors to determine changes in orientation of the mobile phone and thus changes in direction of the BTS from the initial detection of the desired antenna direction. The orientation sensors can be further monitored for determining changes in the orientation from the most-recent orientation determination. Using the changes in orientation, the mobile phone can change the direction of a main beam associated with one or more antennas of the mobile phone so that the main beam is directed toward the BTS. For example, the orientation can be determined using a three dimensional gyroscope and/or a three dimensional compass plus information as to the direction of gravity relative to the mobile phone. Further, location of the mobile device can be monitored, e.g., through use of global positioning system (GPS) or other satellite positioning system (SPS) information (e.g., GLONASS information). The location information can be used in determining the direction of the BTS relative to mobile device. These techniques are examples only and are not limiting of the disclosure or the claims. For example, while the description focuses on cellular phone technology, the techniques described have other applications such as high-frequency communications such as 60 GHz communications systems, or even light-based communications, e.g., infrared systems or laser systems.

Figure 1:
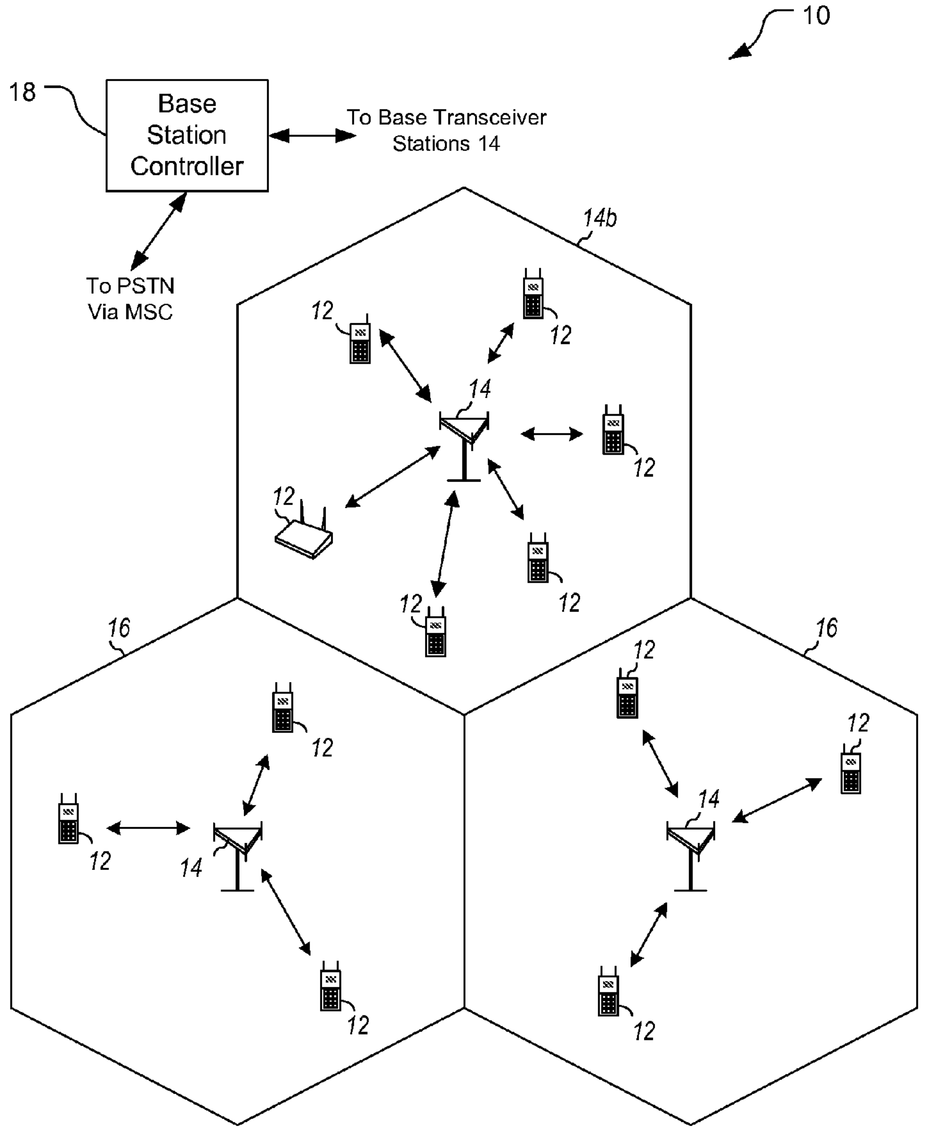
FIG. 1 is a schematic diagram of a wireless telecommunication system.

Referring to FIG. 1, a wireless communication system 10 includes mobile access terminals 12 (ATs), base transceiver stations (BTSs) 14 disposed in cells 16, and a base station controller (BSC) 18. The system 10 may support operation on multiple carriers (waveform signals of different frequencies). The system 10 is a communication system in that the system 10 can at least send or receive communications although it need not be, but preferably is, able to send and receive communications. Multi-carrier transmitters can transmit modulated signals simultaneously on the multiple carriers. Each modulated signal may be a CDMA signal, a TDMA signal, an OFDMA signal, a SC-FDMA signal, etc. Each modulated signal may be sent on a different carrier and may carry pilot, overhead information, data, etc.

The BTSs 14 can wirelessly communicate with the terminals 12 via antennas. Each of the BTSs 14 may also be referred to as an access point, an access node (AN), a Node B, an evolved Node B (eNB), etc. The BTSs 14 are configured to communicate with the ATs 12 under the control of the BSC 18 via multiple carriers. Each of the base stations 14 can provide communication coverage for a respective geographic area, here the respective cells 16. Each of the cells 16 of the base stations 14 is partitioned into multiple sectors as a function of the base station antennas.

The system 10 may include only macro base stations 14 or it can have base stations 14 of different types, e.g., macro, pico, and/or femto base stations. A macro base station may cover a relatively large geographic area (e.g., several kilometers in radius) and may allow unrestricted access by terminals with service subscription. A pico base station may cover a relatively small geographic area (e.g., a pico cell) and may allow unrestricted access by terminals with service subscription. A femto or home base station may cover a relatively small geographic area (e.g., a femto cell) and may allow restricted access by terminals having association with the femto cell (e.g., terminals for users in a home).

The ATs 12 can be dispersed throughout the cells 16. The ATs 12 may be referred to as mobile stations, mobile devices, user equipment (UE), or subscriber units. The ATs 12 here include cellular phones and a wireless router, but can also include personal digital assistants (PDAs), other handheld devices, netbooks, notebook computers, etc.

Figure 2:
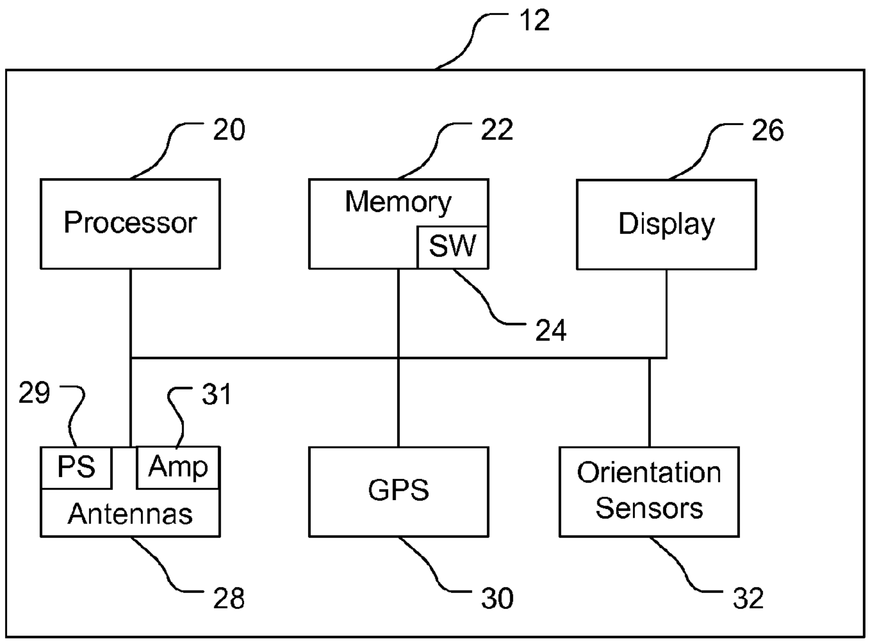
FIG. 2 is a block diagram of components of a mobile station shown in FIG. 1.

Referring also to FIG. 2, an exemplary one of the ATs 12 comprises a computer system including a processor 20, memory 22 including software 24, a display 26, antennas 28, a satellite positioning system module, here a Global Positioning System (GPS) module 30, and orientation sensors 32. The antennas 28 include a transceiver configured to communicate bi-directionally with the BTSs 14 via the antennas 28. The processor 20 is preferably an intelligent hardware device, e.g., a central processing unit (CPU) such as those made by ARM®, Intel® Corporation, or AMD®, a microcontroller, an application specific integrated circuit (ASIC), etc. The processor 20 could comprise multiple separate physical entities that can be distributed in the AT 12. The memory 22 includes random access memory (RAM) and read-only memory (ROM). The memory 22 stores the software 24 which is computer-readable, computer-executable software code containing instructions that are configured to, when executed, cause the processor 20 to perform various functions described herein. Alternatively, the software 24 may not be directly executable by the processor 20 but is configured to cause the computer, e.g., when compiled and executed, to perform the functions.

In this example, the mobile device 12 as configured to use beam forming to direct an antenna beam. The mobile device 12 here includes three antennas 28 (although other quantities of antennas could be used) as part of an antenna module and the antennas 28 further include corresponding phase shifters 29. Each of the antennas 28 preferably has its own dedicated phase shifter 29. The phase shifters 29 are connected to the processor 20 and can respond to commands from the processor 20 to affect the phase of signals provided to the antennas 28 for transmission to the BTS 14.

The GPS module 30 includes appropriate equipment for monitoring GPS signals from satellites and determining position of the mobile device 12. For example, the GPS module 30 includes one or more GPS antennas, and can either communicate with the processor 20 to determine location information or can use its own processor for processing the received GPS signals to determine the location of the mobile device 12. Further, the GPS module 30 can communicate with other entities such as a position determination entity and/or the BTS 14 in order to send and/or receive assistance information for use in determining the location of the mobile device 12.

Figure 3:
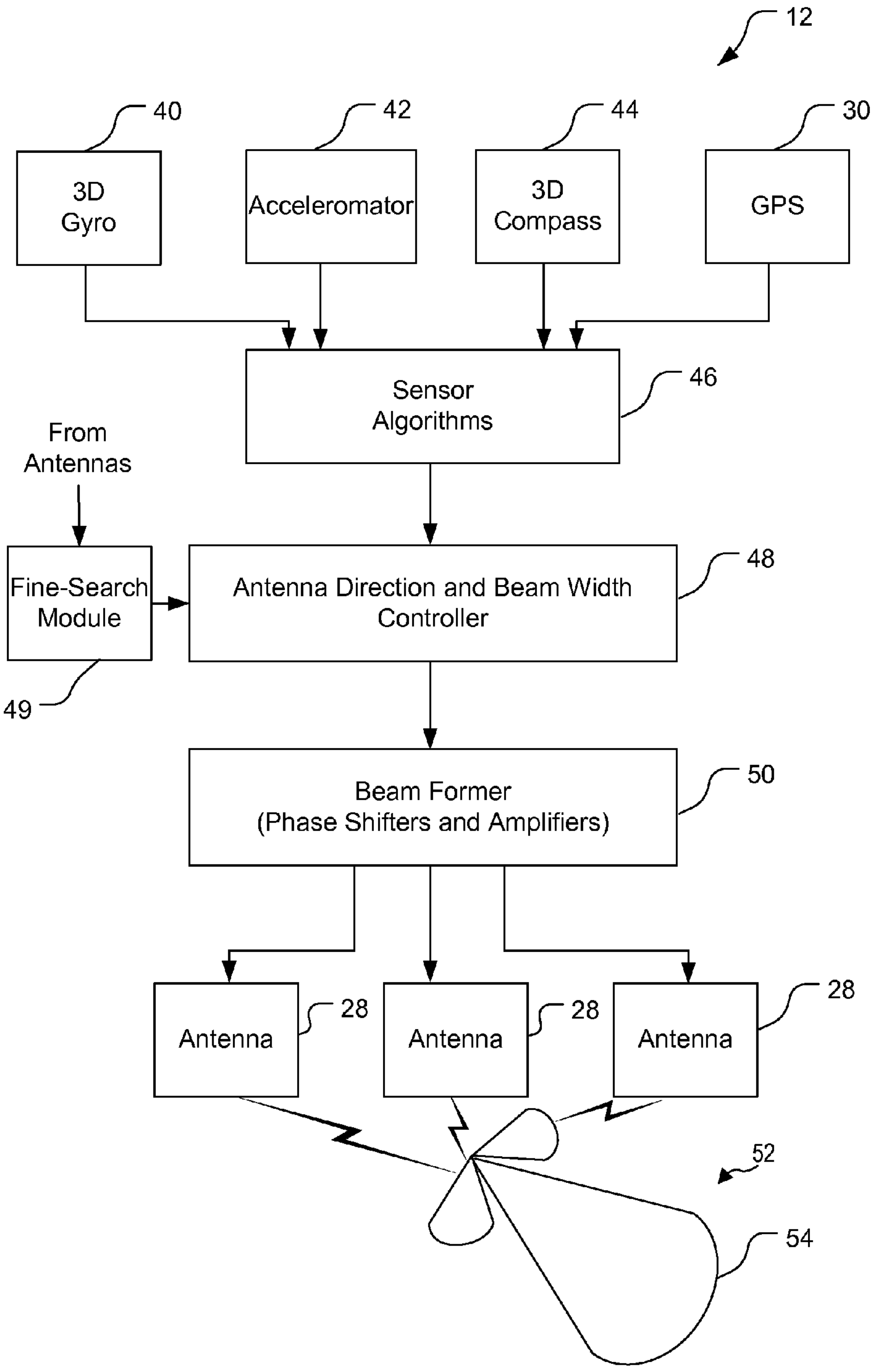
FIG. 3 is a combined block and functional-block diagram of the mobile station shown in FIG. 2.

The orientation sensors 32 are configured to determine an initial orientation of the mobile device 12 and to provide information as to changes in the orientation of the mobile device 12. Referring also to FIG. 3, the orientation sensors 32 include a three-dimensional gyroscope 40, an accelerometer 42, and a three-dimensional compass 44. The orientation sensors 32 are configured to provide information from which the orientation of the mobile device 12 can be determined. The sensors 32 can provide information over time (e.g., periodically, in response to an event such as a change in position or orientation, etc.) such that present and past positions and/or orientations can be compared to determine changes in the position and/or orientation of the mobile device 12. The gyroscope 40 can provide information as to motion of the mobile device 12 affecting the orientation. The accelerometer 42 is configured to provide information as to gravitational acceleration such that the direction of gravity relative to the mobile device 12 can be determined as well as changes in speed (e.g., a vehicle starting to move, speed up, slow down, make a turn, etc.). The three-dimensional compass 44 is configured to provide an indication of the direction, in three dimensions, of magnetic north relative to the mobile device 12, e.g., to a coordinate system of the mobile device 12.

The mobile device 12 shown in FIG. 2 includes the gyroscope 40, the accelerometer 42, the compass 44, and the GPS module 30. Other examples of mobile devices, however, may not include all of these components 40, 42, 44, 30. For example, a mobile device may include the three-dimensional gyroscope 40 only. Alternatively, a mobile device may include the accelerometer 42 and the three-dimensional compass 44 only. Alternatively still, a mobile device having either the gyroscope 40 or the accelerometer 42 and the compass 44 may include the GPS module 30. Still other examples/configurations are possible and the examples provided are not a complete or exhaustive list of possibilities.

Information from the sensors 40, 42, 44, 30 is provided to a sensor module 46 with sensor algorithms. The sensor algorithms 46 are implemented by the processor 20 in conjunction with the software 24 stored in the memory 22. These algorithms, as executed by the processor 20, are configured to process the information from the sensors 40, 42, 44, 30 to determine changes in the direction of the BTS 14 relative to a previous position and orientation of the mobile device 12 (e.g., the initial orientation, a most-recent prior orientation, or a different reference orientation). Thus, preferably six dimensions of information are determined, a three-dimensional change in position and a three-dimensional change in orientation, resulting in a three-dimensional change in antenna beam direction relative to the mobile device 12. The algorithms 46 use information as to changes in the orientation relative to gravity as well as changes in position of the mobile device 12 relative to the earth in order to assist in determining the present direction of the BTS 14 relative to the coordinate system of the mobile device 12. For example, the algorithms 46 can determine the initial position of the mobile device 12 relative to the BTS 14, determine the orientation of the mobile device 12 relative to gravity, and determine a desired direction of an antenna beam from the mobile device 12 to the BTS 14. Further, using information as to changes in the position and/or orientation of the mobile device 12, the algorithms 46 can determine changes in the desired antenna beam direction relative to the coordinate system of the mobile device 12 in order to have the antenna beam point toward the BTS 14. The beam need not point directly at the BTS 14 (i.e., line-of-sight between the mobile device 12 and the BTS 14 is not required), but preferably points toward the BTS 14 enough so that a desired amount of gain is provided in the direction of the BTS 14 to provide good/desired signal channel characteristics (e.g., quality, power, signal-to-noise ratio (SNR), signal-to-noise-and-interference ratio (SINR), etc.).

Information determined from the sensor algorithms 46 as to the initial orientation of the mobile device relative to the BTS 14 and/or changes in the orientation of the mobile device 12 relative to the desired BTS 14 are provided to an antenna direction (and width) controller 48. The controller 48 can affect the beam width of the main beam as discussed further below with respect to FIG. 7. The antenna direction controller 48 is also implemented by the processor 20 executing appropriate software 24 stored in the memory 22. The antenna direction controller 48 determines adjustments to be made in order to direct or redirect the main antenna beam from the mobile device 12 toward the desired BTS 14. The controller 48 determines these adjustments based on the changes in orientation of the mobile device 12, especially changes in the orientation of the mobile device 12 relative to the desired BTS 14 determined by the sensor algorithms 46. To implement the adjustments, the antenna direction controller 48 determines phase shifts to be implemented by the phase shifters 29 for the respective antennas 28 to electronically form or direct the main beam of the antennas 28 toward the desired BTS 14.

The antenna direction and beam width controller 48 provides information for forming the main beam of the antennas 28 to a beam-altering module/beam former 50. The antenna pattern including the main beam can be formed and used for transmitting or receiving information, providing highest gain to/from a desired direction and lesser gain to/from undesired directions. Here, the beam former 50 comprises the phase shifters 29 and amplifiers 31 for electronically altering the excitation signals provided to the antennas 28. The relative phases of the signals provided to the antennas 28 via the phase shifters 29 will cause the main beam of the antennas 28 to point in a desired direction. As shown, the antennas 28 receive signals from the beam former 50 and are excited by the signals, inducing an antenna pattern 52 with a main beam 54 directed in accordance with the phases of signals provided by the beam former 50. The phases provided by the beam former 50 of the excitation signals for the antennas 28, combined with a layout of the antennas 28, result in the main beam 54 being directed in a desired direction. Here, in this example with three antennas 28 in a line, the main beam 54 can be directed/redirected in one dimension while, if antennas are disposed in a 2-dimensional array, then the main beam 54 could be directed/redirected in two dimensions.

The mobile device 12 also includes a fine-search module 49. The module 49 is in parallel with the sensors 30, 40, 42, 44, and is configured to monitor the quality of signals received through the antennas 28. The signals from the antennas 28 may be sensed or measured directly or indirectly (e.g., by monitoring signals in receive circuitry or output from this circuitry), e.g., by the processor 20 analyzing received signals, to determine a measure of the signal quality (e.g., power). The module 49 tracks the signal quality to determine if the direction of the BTS 14 is moving away from the peak of the main beam toward a null in the antenna pattern. The module 49 can respond to sensing that the quality (e.g., as indicated by received power level) is dropping or has dropped undesirably (e.g., greater than a relative amount such as 3 dB) by providing an indication to the controller 48. This indication can be an indication that the signal quality is dropping or that the signal quality is below a desired quality, or can be an indication/command to widen the main beam 54. The module 49 could also indicate to narrow the beam 54 and/or decrease the power, or the controller 48 could determine to narrow the beam 54 and/or decrease the power, e.g., if signal quality is good, e.g., for longer than a signal quality threshold time, and/or if device motion is lower than a threshold, e.g., for longer than a movement threshold time.

The antenna direction controller 48 is also configured to provide information for forming the main beam 54 of the antennas 28 to the beam former 50 to produce a desired width of the main beam 54. The controller 48 provides indications of phase and amplitude to be implemented by the phase shifters 29 and the amplifiers 31 for the signals provided to the antennas 28 to produce the beam 54 with the desired width. The desired width can be determined by the controller 48 in a variety of ways. For example, the width can be increased in response to the indication from the fine-search module 49 that the signal quality has decreased, or in response to a command from the module 49 to widen the beam 54. The width of the beam 54 can be reduced periodically in the absence of the indication/command from the module 49, and with any change in orientation of the device 12 being less than a threshold amount of change, or being less than the change threshold for more than a threshold time. A reduction in beam width, implemented by the controller 48, could be linear (e.g., a fixed number of degrees each time the width is adjusted) or non-linear (e.g., increasing amounts of degrees smaller each time the width is adjusted). As another example, the width can be set to a desired width as a function of the amount of change in beam direction (e.g., directly proportional to the change, set to one of a N widths depending on the amount of change being within one of N ranges of change, etc.). The available widths of the beam 54 depends, e.g., upon the number of antennas 28, the arrangement of the antennas 28, the available variation of the phase shifters 29 and/or the amplifiers 31, etc.

The controller 48 can affect the amount of power used by the amplifiers 31 and thus provided in the beam 54. Preferably, the power would vary in relation to the beam width, in an inverse fashion. For wider beam widths, the controller 48 can cause the amplifiers 31 to use more power cumulatively, and for narrower beam widths, the controller 48 can cause the amplifiers 31 to use less power cumulatively (i.e., for the amplifiers 31 combined). The variation could be linear, stepped (e.g., one of several discrete power levels for each of several corresponding beam width ranges, etc.).

Figure 4:
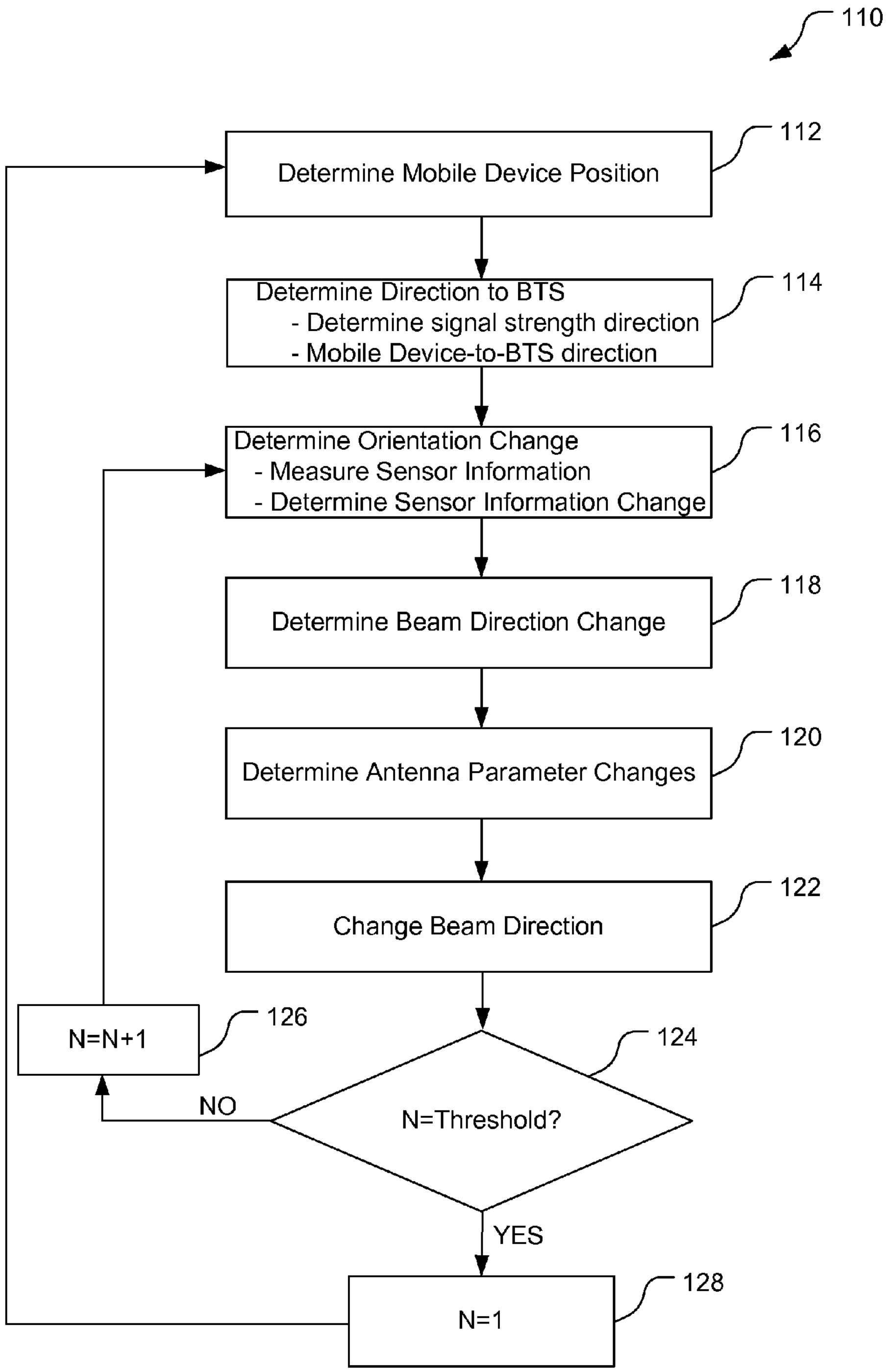
FIG. 4 is a block flow diagram of a process of determining a desired antenna direction from a mobile station and updating the antenna direction with changes in orientation of the mobile device.

Referring to FIG. 4, with further reference to FIGS. 1-3, a process 110 of directing an antenna direction based on orientation sensor measurements includes the stages shown. The process 110 is, however, an example only and not limiting. The process 110 can be altered, e.g., by having stages added, removed, rearranged, combined, and/or performed concurrently.

At stage 112, the position of the mobile device 12 is determined. The GPS module 30 determines the location of the mobile device 12 relative to the earth. The GPS module 30 may communicate with other entities such as a position determining entity in order to determine the position of the mobile device 12.

At stage 114, the mobile device 12 determines the direction from the mobile device 12 to a desired BTS 14. For example, the processor 20 can analyze strengths of signals received by the antennas 28. The processor 20 can determine a direction of greatest signal strength from one of the BTSs 14 as the direction toward a desired BTS 14. Alternatively, the processor 20 can communicate with the GPS module 30 to determine the location of the mobile device 12 relative to the earth and to communicate with the memory 22 to determine locations of local BTSs 14. The processor 20 can select one of the local BTSs 14, e.g., the closest BTS 14, the BTS 14 most likely to have a direct line of sight to the mobile device 12, etc., and determine the desired direction from the mobile device 12 to the desired BTS 14 using mathematical calculations. The processor 20 further determines the orientation of the mobile device 12, using information provided by the orientation sensors 32. The processor 20 combines the orientation information with the mobile device-to-BTS direction to determine the three-dimensional direction of the BTS 14 relative to the mobile device 12.

At stage 116, the processor 20 determines changes in the orientation of the mobile device 12. The processor 20 continues to determine the orientation of the mobile device 12 by applying the sensor algorithms 46 to the available sensor information from the gyroscope 40, the accelerometer 42, and the compass 44. The processor 20 stores the orientation information and determines a difference between the present orientation of the mobile device 12 with a previous orientation of the mobile device 12 to determine the change in the orientation. The previous orientation can be any previous orientation such as an initial orientation, a most-recent orientation, etc.

At state 118, the processor 20 determines a desired change in the beam direction corresponding to the change in the orientation of the mobile device 12. The processor 20 uses the change in orientation of the mobile device 12 to determine desired changes in the beam direction in order to have the main beam 54 point toward the desired BTS 14.

At stage 120, the processor 20 uses the desired change in beam direction determined at stage 118 to determine parameters to affect the desired change in direction of the main beam 54. Here, the processor 20 determines phase values (either phase amount changes or desired amount of phase) for the phase shifters 29 in order to direct the main beam 54 as desired.

At stage 122, the determined phase values are provided to the phase shifters 29 to change the, preferably three-dimensional, direction of the main beam 54. The phase shifters 29 alter the amount of phase shift induced by the phase shifters 29, thereby affecting the incoming signals by the corresponding phase amounts, which are then provided to the antennas 28. The main beam 54 induced by the signals received by the antennas 28 is then directed, preferably in three dimensions, in accordance with the phases of the signals from the phase shifters 29.

At stage 124, an inquiry is made as to whether a counter has reached a threshold. If the counter has not reached the threshold, then at stage 126, the counter is incremented and the process 110 returns to stage 116 where the change in orientation of the mobile device 12 is determined. If, however, the counter has reached the threshold, then at stage 128, the counter is reset to 1 and the process 110 returns to stage 112 where the location of the mobile device 12 is determined using the GPS module 30. In this way, the location of the mobile device is periodically determined, less frequently than the orientation change is determined, to update the desired direction of the main beam 54 for the desired BTS 14. This can help refine the direction of the main beam 54 while allowing speedier processing most often by using information from the orientation sensors 40, 42, 44 without using location information from the GPS module 30 Alternatively, stages 124, 126, 128, can be omitted from the process 110 such that the location of the mobile device 12 as determined by the GPS module 30 is used each time in determining changes in orientation of the mobile device 12, at least the orientation of the main beam 54 relative to the desired BTS 14.

Figure 5:
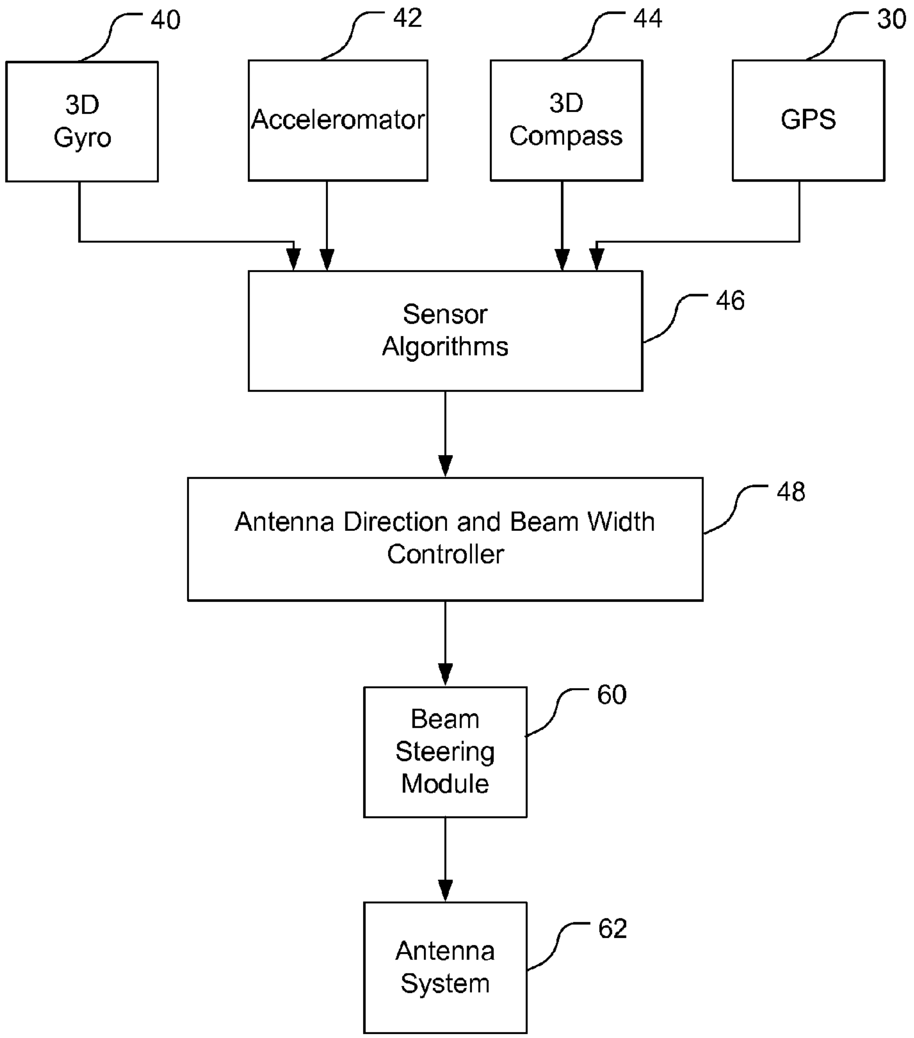
FIG. 5 is an alternative combination block and functional-block diagram of a system for directing and redirecting an antenna beam based on orientation of a mobile device.

Other techniques may be employed for directing the main beam 54, or another main beam, toward a particular BTS 14. For example, referring to FIG. 5, instead of the mobile device 12 including the beam former 50 and three antennas 28, as shown in FIG. 3, a different mobile device 12 includes a beam steering module 60 and an antenna system 58. The module 60 may be particularly useful for infrared and laser applications. Various configurations of the antenna system 58 and the beam steering module 60 are possible. For example, the antenna system 58 may include multiple antennas with main beams directed at fixed, different orientations relative to the mobile device 12. The beam steering module 60 would be configured to use the information from the antenna direction controller 48 in order to select the most appropriate antenna from the antenna system 58 to provide a main beam directed most closely to the desired BTS 14. As another example, the antenna system 58 may comprise one or more antennas with fixed phase providing a stationary main beam 54 and the beam steering module 60 is configured to move the direction of the beam produced by the antenna system 58. For example, the beam steering module 60 could comprise a reflector that is mechanically moved to reflect the beam provided by the antenna system 58 to different directions. Alternatively, the beam steering module 60 could provide a transparent lens with changing optical characteristics such as a changing refraction index in order to direct the stationary beam from the antenna system 58 to a desired direction. Alternatively still, the antenna system 58 could provide a stationary beam relative to one or more antennas and the beam steering module 60 could comprise a mechanical gimbal on which the antenna system 58 rests. The beam steering module 60 would move the physical orientation of the antenna system 58 to a desired direction to point the main beam toward the desired BTS 14. Alternatively, the module 60 could employ micro electro-mechanical systems (MEMS) technology.

Figure 6:
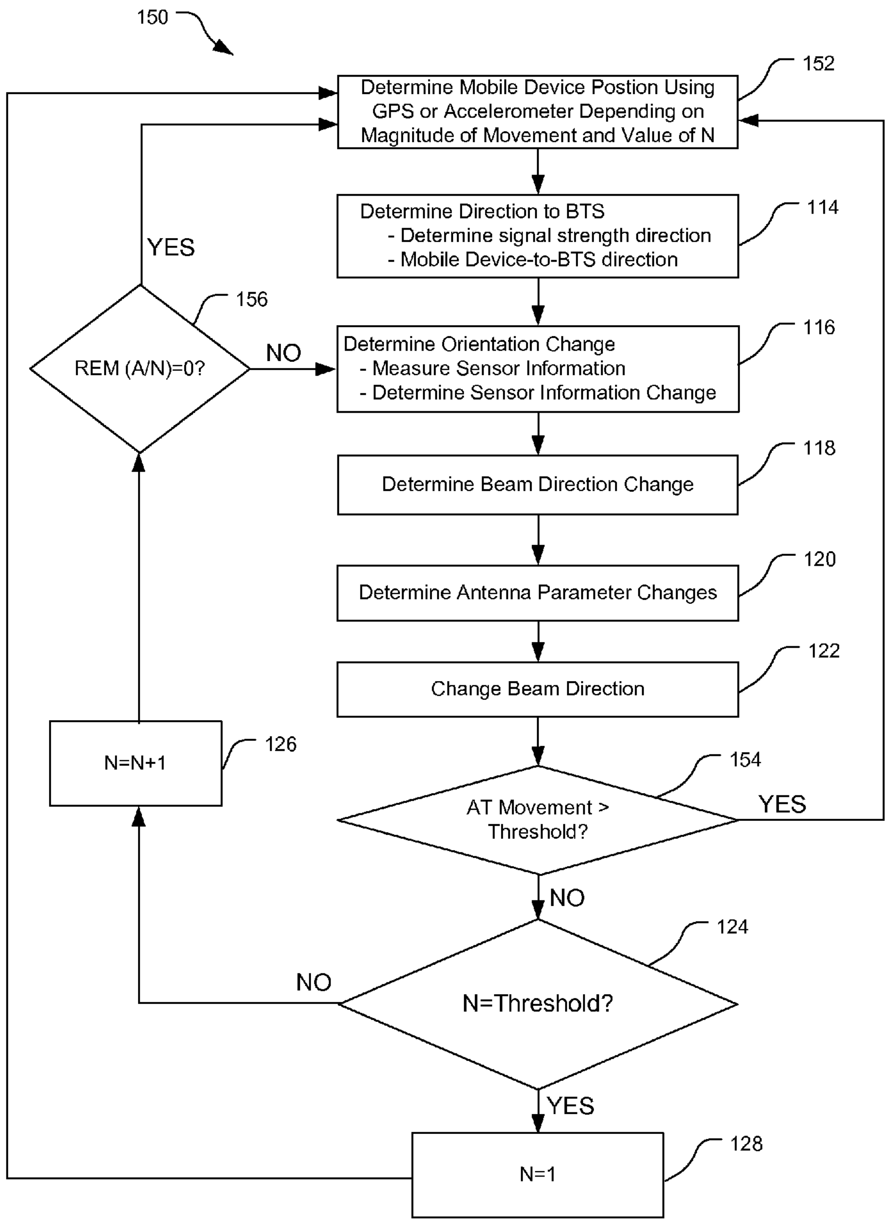
FIG. 6 is a block flow diagram of an alternative process of determining a desired antenna direction from a mobile station and updating the antenna direction with changes in orientation of the mobile device.

Further, referring to FIG. 6, with further reference to FIGS. 1-3, an alternative process 150 of directing an antenna direction based on orientation sensor measurements includes the stages shown. The process 150 is, however, an example only and not limiting. The process 150 can be altered, e.g., by having stages added, removed, rearranged, combined, and/or performed concurrently. Using the process 150, AT position can be re-determined if the AT 12 moves more than a threshold amount. The position can be re-determined using either accelerometer information or GPS information depending on the magnitude of the movement. Further, AT position can be re-determined using accelerometer information periodically, and using GPS information periodically, but less often than using accelerometer information.

At stage 152, the position of the mobile device 12 is determined. In this stage, either the GPS module 30 or the processor 20 in combination with the accelerometer 42 determines the location of the mobile device 12 relative to the earth. Accelerometer information is used after the first time through the process 150 if AT movement greater than a first threshold, but lower than a second threshold is detected, or if a value of a predetermined constant is a multiple of a counter value and the counter value is less than a count threshold. GPS information is used to determine AT position the first time through the process 150, if AT movement is greater than a second movement threshold, or when the counter reaches the count threshold.

Stages 114, 116, 118, 120, and 122 of the process 150 are similar to these stages of the process 110 described above.

At stage 154, a determination is made as to whether the AT 12 has moved more than a threshold amount. The processor 20 uses information from the accelerometer 42 to determine whether the AT has moved more than a first, lower movement threshold amount. If the AT has moved more than the first threshold, then the process 150 returns to stage 152 where the position of the AT 12 is determined. The position is determined using the accelerometer output and the most recent GPS position if the movement is less than a second, higher movement threshold that is greater than the first, lower movement threshold. The position is determined using the GPS module 30 if the movement is greater than the second movement threshold amount. If at stage 154 the processor 20 determines that the movement of the AT 12 is not greater than the first movement threshold amount, then the process 150 proceeds to stage 124.

At stage 124, an inquiry is made as to whether counter has reached a threshold. If the counter has not reached the threshold, then at stage 126, the counter is incremented and the process 150 proceeds to stage 156 where the processor 20 determines whether a remainder of a quotient of a constant, A, divided by the counter value N is zero. If so, then the process returns to stage 152 where the position of the AT 12 is determined using accelerometer information. Otherwise, the process 150 returns to stage 116 where the change in orientation of the mobile device 12 is determined. If, however, at stage 124 the counter has reached the threshold, then at stage 128, the counter is reset to 1 and the process 150 returns to stage 152 where the location of the mobile device 12 is determined using the GPS module 30. In this way, the location of the mobile device is periodically determined using accelerometer information more often than the position is periodically determined using GPS information, and is determined less frequently than the orientation change is determined.

Figure 7:
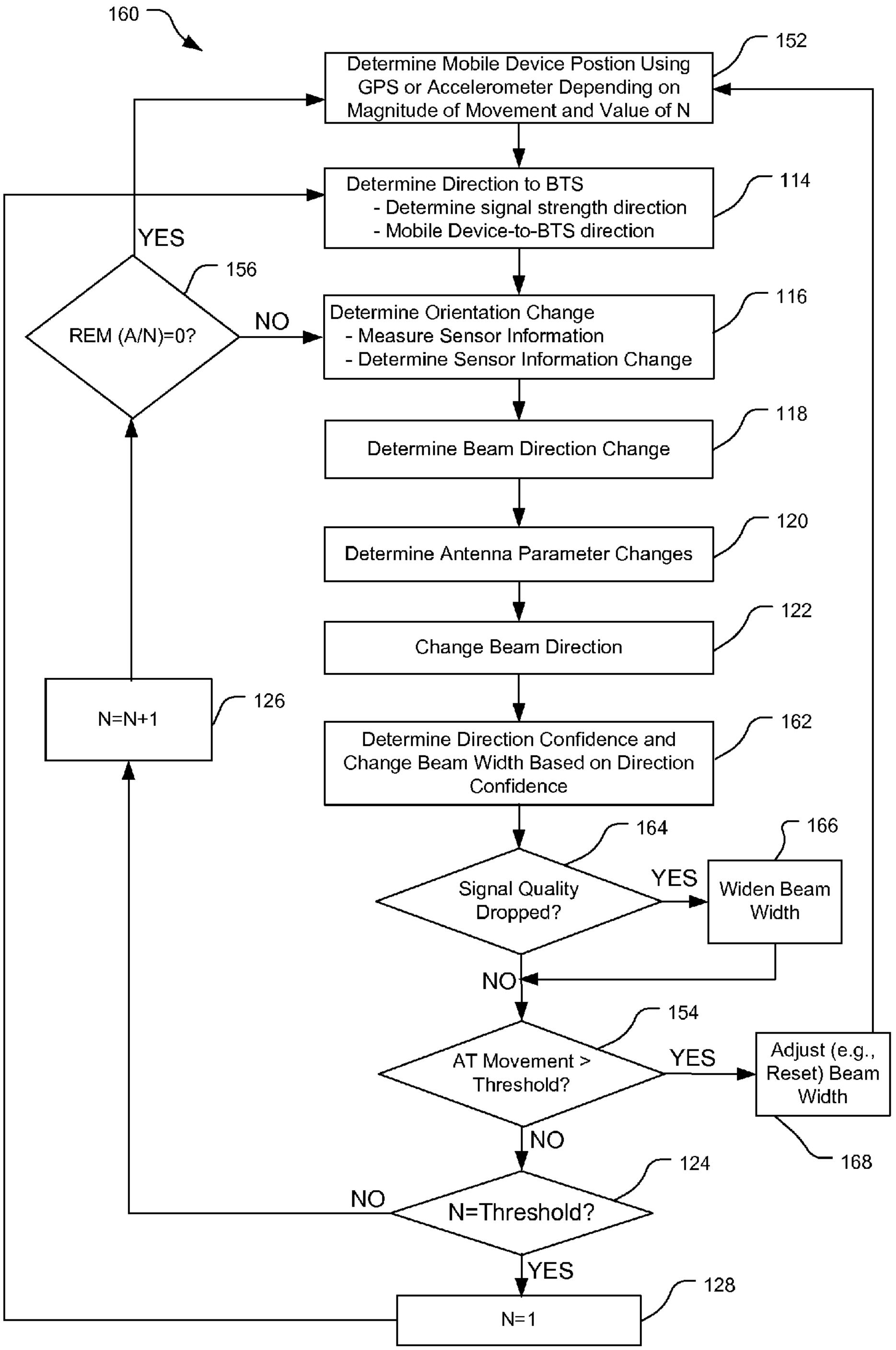
FIG. 7 is a block flow diagram of a process of determining a desired antenna direction from a mobile station, updating the antenna direction with changes in orientation of the mobile device, and selectively altering a width of an antenna beam.

Further, referring to FIG. 7, with further reference to FIGS. 1-3, a process 160 of directing and selectively focusing an antenna beam based on orientation sensor measurements includes the stages shown. The process 160 is, however, an example only and not limiting. The process 160 can be altered, e.g., by having stages added, removed, rearranged, combined, and/or performed concurrently. Using the process 160, the antenna beam's width (e.g., 3 dB width) can be adjusted based on a confidence of the direction of the BTS 14 and motion of the AT 12 (i.e., implied confidence of the beam direction).

Stages 152, 154, 156, 114, 116, 118, 120, 122, 124, 126, and 128 of the process 160 are similar to these stages of the process 150 described above.

At stage 162, a determination is made as to a confidence level of the direction of the BTS 14 relative to the AT 12, and the beam width adjusted as appropriate. For example, the processor 20 determines whether the beam direction change determined in stage 118 satisfies one or more criteria, e.g., is less than a threshold change, is less than the threshold change for longer than a threshold time (or for a threshold number of increments of the counter), etc. If the change satisfies the one or more criteria, then the antenna direction controller 48 determines adjustments, if any, to be made in order to focus the main antenna beam from the mobile device 12 as desired (i.e., to leave the focus alone, to narrow the main beam width, or to broaden the main beam width). To implement the adjustments, the antenna direction and width controller 48 determines phase shifts and signal amplitudes to be provided by the phase shifters 29 and amplifiers 31 for the respective antennas 28 to electronically form the main beam of the antennas 28 with a desired main beam width.

The desired width can be determined or set in a variety of ways. For example, the width can be reduced (narrowed), e.g., each time stage 162 occurs, with the change in beam direction being less than a threshold amount of change, or each time only after the change in beam direction is less than the change threshold for more than a threshold number of consecutive times through the process 160. Further, the width can be reduced less often than each time through the process 160. The main beam of the antenna pattern can be narrowed in response to termination of an indication of signal quality being poor or termination of an indication of motion exceeding a motion threshold. The reduction could be linear (e.g., a fixed number of degrees each time the width is adjusted), non-linear (e.g., increasing amounts of degrees smaller each time the width is adjusted), or set to a discrete level, etc. As another example, the width can be set to a desired width as a function of the amount of change in beam direction (e.g., directly proportional to the change, set to one of a N widths depending on the amount of change being within one of N ranges of change, etc.). The width will have a lower and an upper limit, e.g., depending upon the number of antennas 28, the arrangement of the antennas 28, the available variation of the phase shifters 29 and/or the amplifiers 31, etc.

At stage 164, a determination is made as to whether the signal quality received by the AT 12 has dropped more than a fine-search threshold amount. The fine-search module 49 monitors the received signal quality. If the fine-search module 49 determines that the signal quality has dropped undesirably, then the process 160 proceeds to stage 166, and otherwise proceeds to stage 154.

At stage 166, the width of the main beam 54 is adjusted as appropriate. The fine-search module 49 responds to the signal quality dropping undesirably by providing an indication or command to the controller 48. The controller 48 responds to the indication or command by providing appropriate information or commands to the beam former 50 to adjust the phase shifters 29 and amplifiers 31 to widen the width of the beam 54 (e.g., in any manner discussed above, or in any other desired manner) and to increase the power in the beam 54 to compensate for the direction change of the device 12 implied by the reduction in signal quality. The process 160 proceeds to stage 154.

At stage 168, with the AT movement determined at stage 154 to exceed a movement threshold, the beam width is adjusted, e.g., reset or widened. The movement threshold, e.g., a macro-movement threshold, used in stage 154 is larger than the direction change implied by the reduction of signal quality corresponding to the fine-search threshold. Thus, the controller 48 will typically, though not necessarily, widen the beam by more, or to a larger width, at stage 168 than at stage 164. With movement exceeding the macro-movement threshold, the direction and width of the beam 54 may not be adequate for acceptable communication with the BTS 14. The controller 48 causes the beam former 50 to adjust the width of the beam 54 as appropriate. Preferably, the controller 48 causes the beam former 50 to reset the width of the beam 54 to a default, large width to help the AT 12 remain in communication with the BTS 14. Alternatively, the adjustment may not be to reset the beam width to a default width, but rather to increase the beam width. The increase in width could be a fixed amount, or the amount could be dependent upon the amount of movement (e.g., magnitude of movement, relative magnitude of movement compared to the threshold, etc.). Further, while FIG. 7 shows that the same movement threshold is used to trigger a beam width adjustment at stage 164 and to cause the process 160 to return to stage 152, different movement thresholds could be used, e.g., with a smaller threshold triggering beam width adjustment than triggering a redetermination of mobile device position.

Still other examples and techniques are possible. For example, while the description discussed a counter being compared against a threshold at stage 124, other techniques could be used. For example, a timer could be used as a trigger for determining location of a mobile device. Alternatively still, an accelerometer could be used as a trigger, such as by integrating an output of the accelerometer to determine speed and using the speed to determine whether and how often to determine location. The frequency of location determination could be proportional, or roughly proportional, to the speed. For example, if the speed is zero or below a small threshold, then there may be no location determination or very infrequent location determination. If, however, the speed is high (e.g., the mobile device is on a train), then the location could be determined more often, e.g., proportional to the speed, or at frequencies corresponding to ranges of speed, or combinations of these techniques. Further still, Doppler information could be determined/collected and used as an indication of the speed and location determination frequency based upon the Doppler information.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Further, a wireless communication network does not have all communications transmitted wirelessly, but is configured to have at least some communications transmitted wirelessly.

A mobile wireless communication device may comprise: an antenna module configured to provide an antenna pattern having a directional beam to transmit electromagnetic energy of outgoing communication signals for reception by a base transceiver station and to receive electromagnetic energy of incoming signals from the base transceiver station; a motion sensor; and a processor communicatively coupled to the antenna module and the motion sensor and configured to: determine at least one of a measure of signal quality of signals received by the antenna module or a measure of motion of the device; provide at least one of an indication corresponding to the signal quality or an indication of the motion exceeding a motion threshold; and cause the antenna module to widen a main beam of the antenna pattern in response to at least one of the indication of signal quality or the indication of the motion exceeding the motion threshold.

This device may include one or more of the following features. The processor is configured to cause the antenna module to widen the main beam in response to the signal quality declining. The processor is configured to cause the antenna module to widen the main beam in response to a relative power of the received signals dropping below a relative power threshold. The processor is configured to cause the antenna module to widen the main beam to a first width in response to the indication of signal quality and to a second width in response to the indication of the motion exceeding the motion threshold, the second width being larger than the first width. The processor is configured to cause the antenna module to increase power provided by the antenna module for the main beam concurrently with widening the main beam. The processor is configured to cause the antenna module to narrow the main beam of the antenna pattern in the absence of the indication of signal quality and the indication of the motion exceeding the motion threshold. The processor is configured to cause the antenna module to decrease power provided by the antenna module for the main beam concurrently with narrowing the main beam. The indication of signal quality is at least one of an indication of signal-to-noise ratio of a received signal or a command to widen the main beam. The motion sensor is configured to provide a measure of three-dimensional motion of the device.

A computer program product may reside on a non-transitory processor-readable medium of a mobile wireless communication device that includes an antenna module and a motion sensor, with the computer program product comprising processor-readable instructions configured to cause a processor to: determine at least one of a measure of signal quality of signals received by an antenna module or a measure of motion of the device; provide at least one of an indication corresponding to the signal quality or an indication of the motion exceeding a motion threshold; and cause the antenna module to widen a main beam of the antenna pattern in response to at least one of the indication of signal quality or the indication of the motion exceeding the motion threshold.

This computer program product may include one or more of the following features. The instructions are configured to cause the processor to cause the antenna module to widen the main beam in response to the signal quality declining The instructions are configured to cause the processor to cause the antenna module to widen the main beam in response to a relative power of the received signals dropping below a relative power threshold. The instructions are configured to cause the processor to cause the antenna module to widen the main beam to a first width in response to the indication of signal quality and to a second width in response to the indication of the motion exceeding the motion threshold, the second width being larger than the first width. The instructions are configured to cause the processor to cause the antenna module to increase power provided by the antenna module for the main beam concurrently with widening the main beam. The instructions are configured to cause the processor to cause the antenna module to narrow the main beam of the antenna pattern in the absence of the indication of signal quality and the indication of the motion exceeding the motion threshold. The instructions are configured to cause the processor to cause the antenna module to decrease power provided by the antenna module for the main beam concurrently with narrowing the main beam. The indication of signal quality is at least one of an indication of signal-to-noise ratio of a received signal or a command to widen the main beam.

A method in a mobile wireless communication device may comprise: transmitting electromagnetic energy of outgoing communication signals, configured for reception by a base transceiver station, using an antenna pattern having a directional beam; receiving electromagnetic energy of incoming signals from the base transceiver station; determining at least one of a measure of signal quality of signals received by the antenna module or a measure of motion of the device; providing at least one of an indication corresponding to the signal quality or an indication of the motion exceeding a motion threshold; and widening a main beam of the antenna pattern in response to at least one of the indication of signal quality or the indication of the motion exceeding the motion threshold.

This method include one or more of the following features. Widening the main beam is in response to the signal quality declining. Widening the main beam in response to a relative power of the received signals dropping below a relative power threshold. The widening comprises widening the main beam to a first width in response to the indication of signal quality and to a second width in response to the indication of the motion exceeding the motion threshold, the second width being larger than the first width. The method may further comprise increasing power provided of the main beam concurrently with widening the main beam. The method may further comprise narrowing the main beam of the antenna pattern in response to termination of the indication of signal quality or termination of the indication of the motion exceeding the motion threshold. The method may further comprise decreasing power of the main beam concurrently with narrowing the main beam. The indication of signal quality is at least one of an indication of signal-to-noise ratio of a received signal or a command to widen the main beam. The determining comprises determining a measure of three-dimensional motion of the device.

Still other techniques and implementations are possible.

What is claimed is:

1. A mobile wireless communication device comprising:
- a communication device housing;
- an antenna module configured to provide an antenna pattern having a directional beam to transmit electromagnetic energy of outgoing signals and to receive electromagnetic energy of incoming signals;
- a beam-altering module communicatively coupled to the antenna module and configured to alter a three-dimensional direction that the directional beam is pointing; and
- a three-dimensional orientation sensor module communicatively coupled to the beam-altering module and configured to obtain three-dimensional orientation information for the communication device, the three-dimensional orientation information indicative of a three-dimensional orientation of the wireless communication device;
- wherein the beam-altering module is configured to determine, based on the three-dimensional orientation information, a desired change in three-dimensional direction of the directional beam in order to compensate for a change in three-dimensional orientation of the wireless communication device; and
- wherein the antenna module is configured to change the three-dimensional direction that the directional beam is pointing based on the determined desired change in three-dimensional direction of the directional beam.

2. The device of claim 1 wherein the beam-altering module is configured to determine a direction from the wireless communication device toward a base transceiver station.

3. The device of claim 2, the wireless communication device further comprising a satellite positioning system module configured to determine a location of the wireless communication device, and wherein the beam-altering module being configured to determine a location of the base transceiver station and being configured to determine the direction from the wireless communication device toward the base transceiver station using the location of the wireless communication device, the location of the base transceiver station, and the orientation of the wireless communication device.

4. The device of claim 2, the wireless communication device further comprising a satellite positioning system module configured to determine a location of the wireless communication device, and wherein the beam-altering module is configured to use the location of the wireless communication device in addition to the change in three-dimensional orientation of the wireless communication device to alter the three-dimensional direction that the directional beam is pointing.

5. The wireless communication device of claim 2 wherein the beam-altering module is configured to determine the direction from the wireless communication device toward the base transceiver station based on strengths of received signals from different receive paths.

6. The wireless communication device of claim 1 wherein the three-dimensional orientation sensor module comprises (1) a three-dimensional gyroscope sensor, or (2) a three-dimensional compass and a gravity sensor, or both.

7. The wireless communication device of claim 1 wherein the beam-altering module comprises a beam-forming module and the antenna module includes a phased-array antenna comprising a plurality of antenna elements and a phase module configured to set phases for corresponding ones of the plurality of antenna elements to point the directional beam in a desired direction.

8. The wireless communication device of claim 1 wherein the beam-altering module comprises a beam-steering module including an antenna direction controller configured to direct the directional beam provided by the antenna module.

9. The wireless communication device of claim 1 wherein the beam-altering module includes a beam width controller configured to adjust a width of the directional beam in response to movement of the device indicated by the three-dimensional orientation sensor module.

10. A mobile wireless communication device comprising:
- an antenna module configured to provide an antenna pattern having a directional beam to transmit electromagnetic energy of outgoing communication signals for reception by a base transceiver station and to receive electromagnetic energy of incoming signals from the base transceiver station;
- direction means for determining a direction of the base transceiver station relative to the communication device;
- orientation means for obtaining three-dimensional orientation information for the communication device indicative of a three-dimensional orientation of the wireless communication device
- direction means for determining, based on the orientation information, a desired change in three-dimensional direction of a directional beam provided by the orientation means of the wireless communication device in order to compensate for a change in three-dimensional orientation of the wireless communication device; and
- altering means for causing the antenna module to change a three-dimensional direction that the directional beam is pointing based on the determined desired change in three-dimensional direction of the directional beam.

11. The wireless communication device of claim 10 wherein the orientation information for the wireless communication device indicates a three-dimensional orientation of the wireless communication device, the direction means including a satellite positioning system module configured to determine a location of the wireless communication device, and wherein the altering means are further for determining a location of the base transceiver station and determining the direction from the wireless communication device toward the base transceiver station using the location of the wireless communication device, the location of the base transceiver station, and the three-dimensional orientation of the wireless communication device.

12. The wireless communication device of claim 10, the direction means including a satellite positioning system module configured to determine a location of the wireless communication device, and wherein the altering means are further for using the location of the wireless communication device in addition to the orientation information to alter the three-dimensional direction that the directional beam is pointing.

13. The wireless communication device of claim 10 wherein the direction means are configured to determine the direction of the base transceiver station relative to the wireless communication device based on strengths of received signals at the wireless communication device from different receive paths.

14. The wireless communication device of claim 10 wherein the altering means include a beam-forming module and the antenna module includes a phased-array antenna comprising a plurality of antenna elements and a phase module configured to set phases for corresponding ones of the plurality of antenna elements to point the directional beam in a desired direction.

15. The wireless communication device of claim 10 wherein the altering means comprise a beam-steering module configured to redirect the directional beam provided by the antenna module.

16. The wireless communication device of claim 10 wherein the altering means are further for adjusting a width of the directional beam in response to movement of the device indicated by the orientation means.

17. A computer program product residing on a non-transitory processor-readable medium and comprising processor-readable instructions configured to cause a processor to:

obtain three-dimensional orientation information for the wireless communication device indicative of a three-dimensional orientation of a wireless communication device;

determine, based on the orientation information, a desired change in three-dimensional direction of a directional beam provided by an antenna module of the wireless communication device in order to compensate for a change in three-dimensional orientation of the wireless communication device; and cause the antenna module to change a three-dimensional direction that the directional beam is pointing based on the determined desired change in three-dimensional direction of the directional beam.

18. The computer program product of claim 17 wherein the orientation information is present orientation information indicative of a present orientation of the wireless communication device and wherein the instructions configured to cause the processor to determine the desired change are configured to cause the processor to analyze a previous orientation of the wireless communication device indicated by previous orientation information and the present orientation of the wireless communication device indicated by the present orientation information to determine a change in orientation of the wireless communication device.

19. The computer program product of claim 17 wherein the instructions configured to cause the processor to determine the desired change are configured to cause the processor to account for available directions of the directional beam achievable by the antenna module of the wireless communication device.

20. The computer program product of claim 17 further comprising instructions configured to cause the processor to:

obtain a location of the wireless communication device;

obtain a location of the base transceiver station; and determine a direction from the wireless communication device toward the base transceiver station using the location of the device, the location of the base transceiver station, and the orientation of the communication device.

21. The computer program product of claim 20 wherein the instructions configured to cause the processor to obtain the location of the wireless communication device are configured to cause the processor to analyze satellite positioning system signals to obtain the location of the wireless communication device.

22. The computer program product of claim 17 wherein the orientation information is indicative of a change in three-dimensional orientation of the wireless communication device, the instructions further comprising instructions configured to cause the processor to obtain a location of the wireless communication device, and the instructions configured to cause the processor to determine the desired change are configured to cause the processor to use the location of the wireless communication device in addition to the three-dimensional orientation information.

23. The computer program product of claim 17 further comprising instructions configured to cause the processor to determine a direction from the wireless communication device toward a base transceiver station based on strengths of received signals at the wireless communication device from the base transceiver station over different receive paths.

24. The computer program product of claim 17 wherein the instructions configured to cause the processor to cause the antenna module to change a three-dimensional direction that the directional beam is pointing are configured to cause the processor cause a change in phase of at least one radiating element of a phased-array antenna of the antenna module.

25. The computer program product of claim 17 wherein the instructions configured to cause the processor to cause the antenna module to change a three-dimensional direction that the directional beam is pointing are configured to cause a beam steering of the directional beam provided by the antenna module.

26. A method of affecting a direction of a mobile wireless communication device antenna, the method comprising:

obtaining a first direction of a base transceiver station relative to the mobile wireless communication device;

obtaining a three-dimensional orientation of the mobile wireless communication device from at least one orientation sensor of the mobile wireless communication device;

determining a second direction of the base transceiver station relative to the three-dimensional orientation of the mobile wireless communication device based upon the first direction and the three-dimensional orientation of the mobile wireless communication device; and setting a three-dimensional beam direction of an antenna beam of an antenna of the mobile wireless communication device according to the second direction.

27. The method of claim 26 wherein obtaining the orientation of the mobile wireless communication device comprises obtaining a change in the orientation of the mobile wireless communication device and setting the beam direction comprises causing a change in a present beam direction according to the change in the orientation.

28. The method of claim 26 wherein obtaining the orientation comprises at least one of (1) obtaining three-dimensional gyroscope information or (2) obtaining three-dimensional compass information and gravity direction information.

29. The method of claim 26 wherein obtaining the first direction comprises at least one of (1) obtaining a location of the mobile wireless communication device using satellite positioning system signals or (2) analyzing strengths of signals received by the mobile wireless communication device from the base transceiver station.

30. The method of claim 26 wherein setting the beam direction comprises beam-forming the antenna beam.

31. The method of claim 26 wherein setting the beam direction comprises beam-steering the antenna beam.

* * * * *